(12) United States Patent
Tani

(10) Patent No.: US 6,905,214 B2
(45) Date of Patent: Jun. 14, 2005

(54) ILLUMINATION APPARATUS AND DISPLAY APPARATUS USING THE ILLUMINATION APPARATUS

(75) Inventor: Naoaki Tani, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/653,329

(22) Filed: Sep. 2, 2003

(65) Prior Publication Data

US 2004/0057027 A1 Mar. 25, 2004

(30) Foreign Application Priority Data

Sep. 3, 2002 (JP) ........................ 2002-257884

(51) Int. Cl.⁷ .......................... G02B 6/00; G03B 21/16; G03B 21/28; G02F 1/1335; F21V 17/00
(52) U.S. Cl. ............................ 353/56; 353/52; 353/98; 349/62; 362/555; 362/581
(58) Field of Search .................. 385/1–3, 901, 385/133, 136; 349/61–64, 69, 5, 7; 362/19, 800, 555, 558, 581, 582, 84; 353/20, 30, 31, 34, 37, 97–99, 56, 52, 85, 86, 119, 122, 55

(56) References Cited

U.S. PATENT DOCUMENTS

| 5,765,934 | A | | 6/1998 | Okamori et al. | |
|---|---|---|---|---|---|
| 5,786,934 | A | | 7/1998 | Chiu et al. | |
| 5,967,653 | A | * | 10/1999 | Miller et al. | 362/580 |
| 6,129,437 | A | | 10/2000 | Koga et al. | |
| 6,227,669 | B1 | | 5/2001 | Tiao et al. | |
| 6,318,863 | B1 | | 11/2001 | Tiao et al. | |
| 6,325,550 | B1 | * | 12/2001 | Hoffman et al. | 385/88 |
| 6,412,953 | B1 | * | 7/2002 | Tiao et al. | 353/98 |
| 6,517,211 | B2 | * | 2/2003 | Mihara | 353/98 |
| 6,547,400 | B1 | * | 4/2003 | Yokoyama | 353/98 |
| 2003/0193649 | A1 | * | 10/2003 | Seki | 353/20 |
| 2003/0218880 | A1 | * | 11/2003 | Brukilacchio | 362/293 |
| 2004/0041984 | A1 | * | 3/2004 | Tani et al. | 353/20 |

FOREIGN PATENT DOCUMENTS

| EP | 1003064 | 5/2000 |
|---|---|---|
| EP | 1158761 | 11/2001 |
| JP | 08227034 | 9/1996 |
| JP | 10253923 | 9/1998 |
| JP | 11282092 | 10/1999 |

* cited by examiner

Primary Examiner—Judy Nguyen
Assistant Examiner—Andrew Sever
(74) Attorney, Agent, or Firm—Volpe and Koenig, P.C.

(57) ABSTRACT

An illumination apparatus comprises an illuminant which radiates diffused light from an outgoing plane and generates heat, a light guiding member configured to guide the diffused light from the illuminant while reflecting the diffused light at the internal surface thereof, and a holding member configured to integrally hold the illuminant and the light guiding member at a predetermined interval. The light guiding member includes an incident end which is close to the outgoing plane of the illuminant, and into which the diffused light is incident and which is larger than the outgoing plane of the illuminant, and an outgoing end which is larger than the incident end. The holding member includes a heat conducting portion configured to conduct the heat generated at the illuminant, and a heat radiating portion configured to radiate heat from the heat conducting portion.

29 Claims, 4 Drawing Sheets

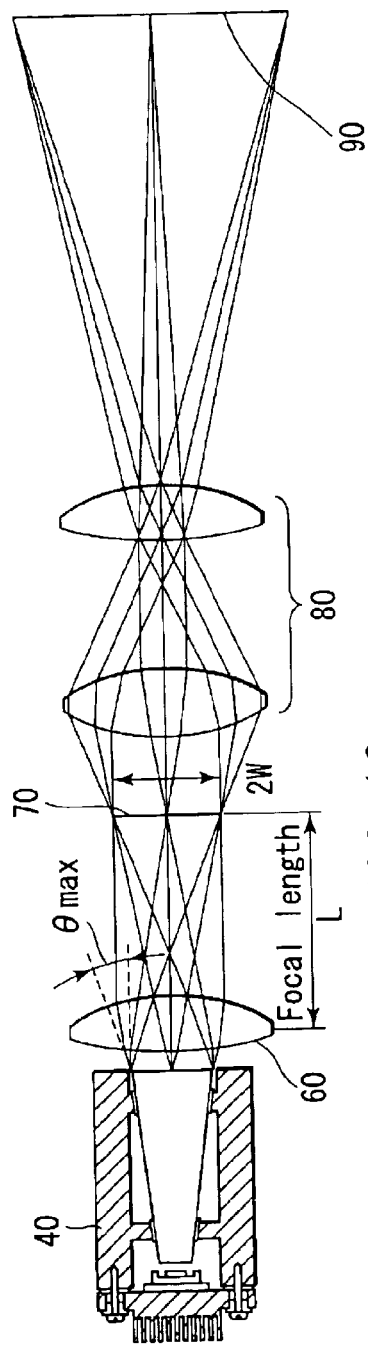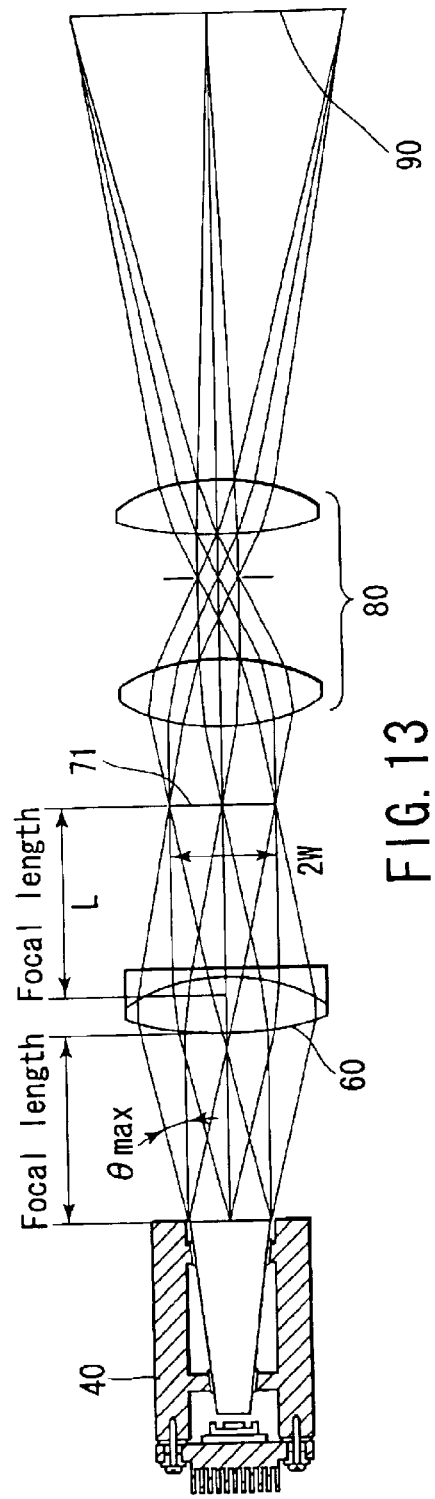

ILLUMINATION APPARATUS AND DISPLAY APPARATUS USING THE ILLUMINATION APPARATUS

CROSS-REFERENCE TO RELATED APPLICATIONS

This application is based upon and claims the benefit of priority from the prior Japanese Patent Application No. 2002-257884, filed Sep. 3, 2002, the entire contents of which are incorporated herein by reference.

BACKGROUND OF THE INVENTION

1. Field of the Invention

The present invention relates to an illumination apparatus in which usage efficiency of light is high and variations in quantity of light are little, and to a display apparatus which projects and displays an image by using the illumination apparatus.

2. Description of the Related Art

Conventionally, as a high directivity illumination apparatus used for a projection display apparatus or the like, examples in which an LED emitting diffused light and a tapered rod are provided thereat are disclosed in U.S. Pat. Nos. 6,318,863 and 6,227,669 B1. Namely, an LED light source is disposed so as to be close to a small-diameter opening of the tapered rod. Light which is incident from the small-diameter opening of the tapered rod into the tapered rod is transmitted so as to be totally reflected at the internal surface of the tapered rod. The respective light rays are converted so as to have small angles, and are emitted from a large-diameter opening of the tapered rod toward a projection lens. Accordingly, an illumination apparatus which can be used for a projection display apparatus using an image display member in which an allowable angle of incident light is narrow can be obtained.

Incidentally, a method for holding an optical part which has a rod shape is disclosed in Japanese Patent Application KOKAI Publication (JP-A) No. 8-227034 and JP-A No. 10-253923. The object of the method in 8-227034 is ensuring a positioning accuracy over a long period, and radiating a thermal stress. In order to attain the objects, a structure in which a rod integrator side surface is biased by a supporting member having a mask function as well and springs is disclosed. Further, the object of 10-253923 is in ensuring a heat resistance of the supporting member of the rod integrator whose temperature becomes high, and ensuring a structural holding accuracy. In order to attain the objects, a structure is disclosed in which the rod integrator is biased onto a supporting member formed from a metal plate by using spring members from the side surface, and at the same time, the rod integrator is biased in the optical axis direction due to the spring members being hooked on one portion of an incident end plane.

BRIEF SUMMARY OF THE INVENTION

According to a first aspect of the present invention, there is provided an illumination apparatus comprising:

an illuminant which radiates diffused light from an outgoing plane and generates heat;

a light guiding member configured to guide the diffused light from the illuminant while reflecting the diffused light at the internal surface thereof, the light guiding member including: an incident end which is close to the outgoing plane of the illuminant, and into which the diffused light is incident and which is larger than the outgoing plane of the illuminant; and an outgoing end which is larger than the incident end; and a holding member configured to integrally hold the illuminant and the light guiding member at a predetermined interval, the holding member including: a heat conducting portion configured to conduct the heat generated at the illuminant; and a heat radiating portion configured to radiate heat from the heat conducting portion.

According to a second aspect of the present invention, there is provided a display apparatus comprising:

an illumination apparatus including:

an illuminant which radiates diffused light from an outgoing plane and generates heat;

a light guiding member configured to guide the diffused light from the illuminant while reflecting the diffused light at the internal surface thereof, the light guiding member having: an incident end which is close to the outgoing plane of the illuminant, and into which the diffused light is incident and which is larger than the outgoing plane of the illuminant; and an outgoing end which is larger than the incident end; and a holding member configured to integrally hold the illuminant and the light guiding member at a predetermined interval, the holding member having: a heat conducting portion configured to conduct the heat generated at the illuminant; and a heat radiating portion configured to radiate heat from the heat conducting portion;

an illumination lens configured to condense the light from the outgoing end of the light guiding member of the illumination apparatus; and an image display member disposed in the vicinity of the rear side focal point position of the illumination lens.

According to a third aspect of the present invention, there is provided a display apparatus comprising:

an illumination apparatus including:

an illuminant which radiates diffused light from an outgoing plane and generates heat;

a light guiding member configured to guide the diffused light from the illuminant while reflecting the diffused light at the internal surface thereof, the light guiding member having: an incident end which is close to the outgoing plane of the illuminant, and into which the diffused light is incident and which is larger than the outgoing plane of the illuminant; and an outgoing end which is larger than the incident end; and a holding member configured to integrally hold the illuminant and the light guiding member at a predetermined interval, the holding member having: a heat conducting portion configured to conduct the heat generated at the illuminant; and a heat radiating portion configured to radiate heat from the heat conducting portion;

an image display member disposed in the vicinity of the outgoing end of the light guiding member of the illumination apparatus; and a projection optical system configured to image an image of the image display member on a projection plane.

According to a fourth aspect of the present invention, there is provided an illumination apparatus comprising:

an illuminant which radiates diffused light from an outgoing plane and generates heat;

light guiding means for guiding the diffused light from the illuminant while reflecting the diffused light at the internal surface thereof, the light guiding means including: an incident end which is close to the outgoing plane of the illuminant, and into which the diffused light is incident and which is larger than the outgoing plane of the illuminant; and an outgoing end which is larger than the incident end; and holding means for integrally holding the illuminant and the light guiding means at a predetermined interval, the holding means including: a heat conducting portion which conducts the heat generated at the illuminant; and a heat radiating portion which radiates heat from the heat conducting portion.

According to a fifth aspect of the present invention, there is provided a display apparatus comprising:

an illumination apparatus including:

an illuminant which radiates diffused light from an outgoing plane and generates heat;

light guiding means for guiding the diffused light from the illuminant while reflecting the diffused light at the internal surface thereof, the light guiding means having: an incident end which is close to the outgoing plane of the illuminant, and into which the diffused light is incident and which is larger than the outgoing plane of the illuminant; and an outgoing end which is larger than the incident end; and holding means for integrally holding the illuminant and the light guiding means at a predetermined interval, the holding means having: a heat conducting portion which conducts the heat generated at the illuminant; and a heat radiating portion which radiates heat from the heat conducting portion;

an illumination lens which condenses the light from the outgoing end of the light guiding means of the illumination apparatus; and image displaying means disposed in the vicinity of the rear side focal point position of the illumination lens.

According to a sixth aspect of the present invention, there is provided a display apparatus comprising:

an illumination apparatus including:

an illuminant which radiates diffused light from an outgoing plane and generates heat;

light guiding means for guiding the diffused light from the illuminant while reflecting the diffused light at the internal surface thereof, the light guiding means having: an incident end which is close to the outgoing plane of the illuminant, and into which the diffused light is incident and which is larger than the outgoing plane of the illuminant; and an outgoing end which is larger than the incident end; and holding means for integrally holding the illuminant and the light guiding means at a predetermined interval, the holding means having: a heat conducting portion which conducts the heat generated at the illuminant; and a heat radiating portion which radiates heat from the heat conducting portion;

image displaying means disposed in the vicinity of the outgoing end of the light guiding means of the illumination apparatus; and projection optical means for imaging an image of the image displaying means on a projection plane.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a diagram showing a structure of a first embodiment of a display apparatus using, as an illumination unit, the illumination apparatus relating to one of the first to third embodiments as a seventh embodiment of the invention;

FIG. 13 is a diagram showing a structure of a second embodiment of an display apparatus using, as the illumination unit, the illumination apparatus relating to one of the first to third embodiments as an eighth embodiment of the invention.

DETAILED DESCRIPTION OF THE INVENTION

Hereinafter, embodiments of the present invention will be described with reference to the drawings.

[First Embodiment]

Figure 1:
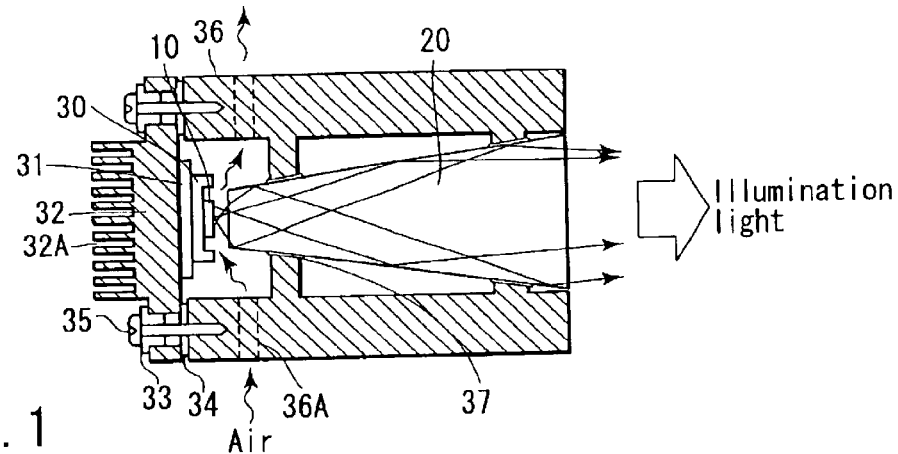
FIG. 1 is a cross sectional view showing a structure of a first embodiment of an illumination apparatus of the present invention.

As shown in FIG. 1, in a first embodiment of an illumination apparatus of the invention, a high intensity light-emitting diode 10 (hereinafter an LED chip) is used as an illuminant, and a tapered rod 20 is used as a light guiding member. Here, the LED chip 10 and tapered rod 20 are integrally held such that the LED chip 10 and an incident end of the tapered rod 20 are disposed at predetermined positions which are closed to one another via a thin air layer by a holding member constituted of an LED base 30, an LED substrate 31, an LED holder 32, collars 33, spacers 34, fixing screws 35, and a rod holder 36. Namely, the LED chip 10 serving as the illuminant is held by the LED holder 32 via the LED base 30 and the LED substrate 31. These LED base 30, LED substrate 31, and LED holder 32 function as a heat conducting portion conducting heat which is generated at the LED chip 10.

The LED holder 32 has radiating fins 32A serving as a heat radiating portion for radiating heat which the LED chip 10 generates. The LED holder 32 is formed from a material having a high heat conductivity, for example, a metal such as an aluminum or the like, in order to efficiently transmit the heat from the above-describe LED chip 10 to the radiating fins 32A. The LED holder 32 is combined with the rod holder 36 by the fixing screws 35 via the collars 33 and the spacers 34 which are formed from a material having low thermal conductivity, for example, ceramics or a plastics. Therefore, it is possible to reduce the transmission of the heat, which the LED chip 10 generates, from the LED holder 32 to the rod holder 36.

The diffused light, which was radiated due to the LED chip 10 being energized, is incident from the incident end of the tapered rod 20 close to the LED chip 10 into the interior of the tapered rod 20. The incident end of the tapered rod 20 is larger than the LED chip 10, and the LED chip 10 and the incident end of the tapered rod 20 are disposed so as to be adjacent to one another via a thin air layer. Therefore, light rays having a broad angle range of the diffused light from the LED chip 10 are incident onto the incident end of the tapered rod 20.

Figure 2:
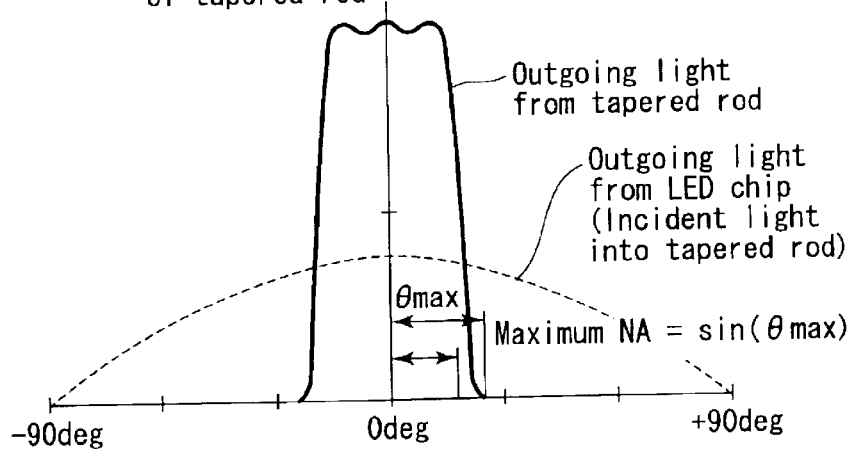
FIG. 2 is an explanatory diagram showing angle conversion characteristics of a tapered rod.

Among the diffused light radiated from the LED chip 10, the light ray which was incident into the tapered rod 20 at a small angle directly reaches an outgoing end of the tapered rod 20 and is emitted while maintaining the original angle as is. Further, the light ray which was incident into the tapered rod 20 at a large angle is totally reflected once or more at the internal surface of the side surface of the tapered rod 20 and is converted into a small angle, and is emitted from the outgoing end of the tapered rod 20. Accordingly, although the diffused light radiated from the LED chip 10 has a broad angle distribution which is called Lambertian, as an example is shown in FIG. 2, the diffused light is converted into a light whose angle distribution is narrow due to the angle conversion effect by the tapered rod 20. In this way, the diffused light from the LED chip 10 can be efficiently fetched by the combination of the LED chip 10 and the tapered rod 20, and at the same time, the radiation angle thereof can be efficiently converted into a narrow angle. Therefore, an illumination apparatus which is bright and has high directivity can be realized with a simple structure.

By the way, accompanying the radiation of the diffused light due to the LED chip 10 being energized, because the electric energy which was not converted into light energy as the diffused light is converted into thermal energy, the LED chip 10 generates heat. The majority of the heat generated at the LED chip 10 is transmitted by the LED base 30, the LED substrate 31, and the LED holder 32 having high heat conductivity, and is heat-radiated from the surface of the LED holder 32, and at the same time, is more effectively radiated to the outside by the radiating fins 32A provided at the LED holder 32. Due to this effect, a temperature rise of the LED chip 10 itself is suppressed at a constant level, and deterioration of the light-emitting characteristic and shortening of the life are prevented. Note that, because these members relating to heat radiation are used as the holding member of the LED chip 10 as well, the heat can be efficiently radiated with a simple structure.

Further, because the air layer is provided between the LED chip 10 and the tapered rod 20, there is no case in which the optical characteristic of the tapered rod 20 deteriorates due to heat being directly transmitted from the LED chip 10 to the tapered rod 20. Further, the temperature of the air contacting the LED chip 10 rises due to the heat generation of the LED chip 10. However, the air can be replaced by convection or forced draft through apertures of the rod holder 36 or air holes 36A provided at the rod holder 36. Therefore, there is no case in which the optical characteristic of the tapered rod 20 deteriorates due to the temperature rise of the air at the surroundings of the tapered rod 20. Note that the invention is not limited to the case of using air, and it goes without saying that the same function and effect can be obtained if another gas or liquid which can carry heat is circulated.

Moreover, as described above, the LED holder 32 is fixed to the rod holder 36 by using the fixing screws 35 with the collars 33 and the spacers 34 which are formed from materials such as low heat conductivity resins or the like being interposed therebetween as a heat insulating portion, and transmission of heat from the LED holder 32 to the rod holder 36 is suppressed. Accordingly, there is no case in which the optical characteristic of the tapered rod 20 deteriorates due to the heat of the LED chip 10 being transmitted to the tapered rod 20 via the rod holder 36.

Note that holding portion coatings 37 are applied onto the contact portions between the tapered rod 20 and the rod holder 36. Concretely, it is configured as shown in partial enlarged views of the rod holding portion of FIG. 3 to FIG. 5.

Figures 3, 4, 5:
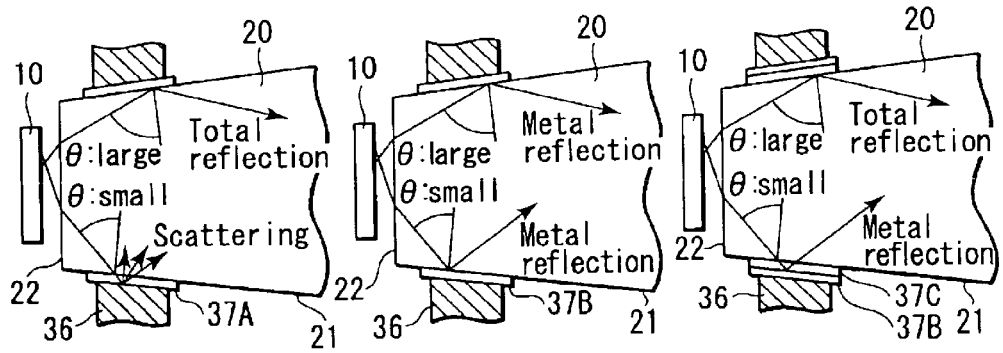
FIG. 3 is a partial cross sectional view of a holding portion of the tapered rod of the illumination apparatus relating to the first embodiment.
FIG. 4 is a partial cross sectional view of another example of the holding portion of the tapered rod of the illumination apparatus relating to the first embodiment.
FIG. 5 is a partial cross sectional view of even another example of the holding portion of the tapered rod of the illumination apparatus relating to the first embodiment.

In an example shown in FIG. 3, low refractive index layers 37A whose refractive index are lower than that of the tapered rod 20 are provided as the holding portion coatings 37 at rod side surface 21 portions of the tapered rod 20 which the rod holder 36 contact. Here, the low refractive index layer 37A may be a dielectric film, a resin, an adhesive, or the like, and the tapered rod 20 and the rod holder 36 are adhered and fixed to one another with the low refractive index layers 37A being interposed therebetween. In accordance with such a structure, among the light incident from the incident end 22 of the tapered rod 20 into the interior of the tapered rod 20, the light ray which is incident into the rod side surface 21 at a small angle is incident into the low refractive index layer 37A, and is diffused at the rod holder 36. Further, the light ray which is incident at a large angle is totally reflected at the interface of the low refractive index layer 37A and the tapered rod 20. Therefore, loss due to the tapered rod 20 being held can be reduced.

Further, in an example shown in FIG. 4, metal films 37B having high reflectance such as Al, Ag, or the like are provided at the rod side surfaces 21 portion of the tapered rod 20 which the rod holder 36 contact. Namely, the tapered rod 20 and the rod holder 36 are adhered and fixed to one another by unillustrated adhesives with the metal films 37B being interposed therebetween. In accordance with such a structure, the light which is incident into the tapered rod 20 goes toward the outgoing end while being totally reflected at the rod side surface 21. In this case, because the light which was incident onto the portion contacting with the rod holder 36 is reflected due to the high reflectance of the metal film 37B regardless of the angle of incidence, loss due to the tapered rod 20 being held can be suppressed so as to be lower.

Further, in an example shown in FIG. 5, a low refractive index film 37C formed from a dielectric film whose refractive index is lower than that of the tapered rod 20 is provided at the rod side surface 21 portion of the tapered rod 20 which the rod holder 36 contacts, and furthermore, the metal film 37B having a high reflectance such as Al, Ag, or the like is provided thereat. Namely, the tapered rod 20 and the rod holder 36 are adhered and fixed to one another by unillustrated adhesives with the low refractive index films 37C and the metal films 37B being interposed therebetween. In accordance with such a structure, the light which is incident into the tapered rod 20 goes toward the outgoing end while being totally reflected at the rod side surface 21. In this case, when the light which was incident onto the portion contacting with the rod holder 36 is incident onto the rod side surface 21 at a large angle of incidence, the light is totally reflected at the interface between the tapered rod side surface 21 and the low refractive index film 37C and goes toward the outgoing end without loss. Further, when the light is incident onto the rod side surface 21 at a small angle of incidence, the light is incident into the interior of the low refractive index film 37C. However, because the light is reflected at the interface between the low refractive index film 37C and the metal film 37B, loss due to the tapered rod 20 being held can be suppressed so as to be lower.

Figure 6:
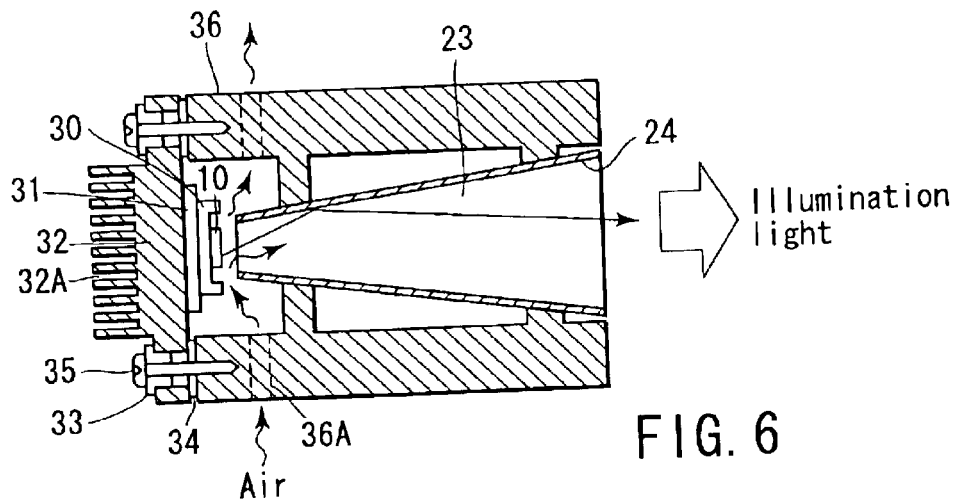
FIG. 6 is a cross sectional view showing a structure of a modified example of the illumination apparatus relating to the first embodiment of the invention.

FIG. 6 is a cross sectional view showing a structure of a modified example of the illumination apparatus relating to the first embodiment of the invention. Namely, in this modified example, the tapered rod 20 in the first embodiment is a hollow tapered pipe 23 whose reflective surface is directed to the internal surface. A reflective mirror 24 on which a high reflectance coating is applied is provided at the internal surface of the tapered pipe 23, and the reflective mirror 24 reflects the incident light ray at a high reflectance, and guides the reflected light to the outgoing end. Accordingly, the effect of the tapered pipe 23 is the same as that of the tapered rod 20.

When the tapered pipe 23 is used, in addition to the effect in the first embodiment as described above, the following characteristic effect is provided. Namely, differently from the case of the tapered rod 20, because there is no problem of scattering or leakage of light by the holding portion, special coating is not required for the holding portion. Further, because the air fetched from the air holes 36A of the holding portion can be flowed by using the hollow portion in the interior of the tapered pipe 23, the effect of heat radiation can be further improved.

[Second Embodiment]

Figure 7:
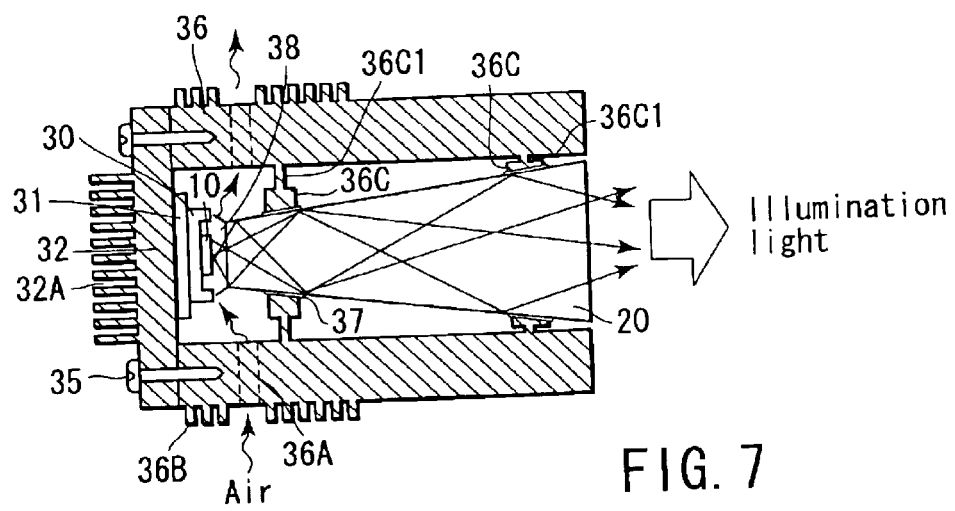
FIG. 7 is a cross sectional view showing a structure of a second embodiment of an illumination apparatus of the invention.

Next, a second embodiment of the present invention will be described. As shown in FIG. 7, in the second embodiment of an illumination apparatus of the invention as well, in the same way as in the first embodiment, the LED chip 10 is used as the illuminant, and the tapered rod 20 is used as the light guiding member. Further, as shown in the drawing, the LED chip 10 and tapered rod 20 are integrally held by the LED base 30, the LED substrate 31, the LED holder 32, the fixing screws 35, and the rod holder 36. However, in the present embodiment, the LED chip 10 and the tapered rod 20 are held such that the LED chip 10 and the incident end 22 of the tapered rod 20 are disposed at predetermined positions adjacent to one another with, not an air layer such as that in the first embodiment, but a transparent resin 38 whose heat conductivity is low and which is a thin translucent heat insulating member being interposed therebetween.

Therefore, in the second embodiment, the diffused light, which was radiated due to the LED chip 10 being energized, permeates through the transparent resin 38, and is incident from the incident end 22 of the adjacent tapered rod 20 to the interior of the tapered rod 20. The incident end 22 of the tapered rod 20 is larger than the LED chip 10, and the LED chip 10 and the incident end 22 of the tapered rod 20 are disposed so as to be adjacent to one another via the thin transparent resin 38. Therefore, the diffused light from the LED chip 10 is efficiently incident from the incident end 22 of the tapered rod 20. Further, the diffused light incident into the tapered rod 20 is converted into a light whose angle distribution is narrow in the same way as in the first embodiment.

In accordance with the illumination apparatus having such a structure, in the same way as in the illumination apparatus relating to the first embodiment, accompanying the radiation of the diffused light due to the LED chip 10 being energized, the majority of the heat generated at the LED chip 10 is transmitted by the LED base 30, the LED substrate 31, the LED holder 32, and the rod holder 36 having high heat conductivity, and is radiated from the surfaces of the LED holder 32 and the rod holder 36, and at the same time, is effectively radiated to the outside by the radiating fins 32A and radiating fins 36B provided at the LED holder 32 and the rod holder 36. Due to this effect, temperature rise of the LED chip 10 itself is suppressed at a constant level, and deterioration of the light-emitting characteristic is prevented.

Further, in the present embodiment, the transparent resin 38 having a heat conductivity lower than the heat conductivity of the LED base 30, LED substrate 31, LED holder 32, rod holder 36, or the like is provided between the LED chip 10 and the tapered rod 20, and heat conduction from the LED chip 10 to the tapered rod 20 is suppressed. Therefore, there is no case in which the optical characteristic deteriorates due to the temperature rise of the tapered rod 20 or arising of the internal temperature gradient. Further, the temperature of the air at the surroundings of the LED chip 10 rises due to the heat generation of the LED chip 10. However, the air is replaced by convection or forced draft through the apertures of the rod holder 36 or the air holes provided at the rod holder 36. Therefore, there is no case in which the optical characteristic of the tapered rod 20 deteriorates due to the temperature rise of the air at the surroundings of the tapered rod 20. Note that, due to the transparent resin 38 being provided, not only the LED chip 10 and the incident end 22 of the tapered rod 20 can be accurately positioned, but also variations in the positions thereof can be made little with respect to external causes, and can be made stable.

Moreover, in the second embodiment, with respect to the rod holder 36, the radiating fins 36B are provided at one portion of the rod holder 36, and narrow portions 36C1 whose cross sectional areas are small are provided along the rod supporting portions 36C actually supporting the tapered rod 20. Due to the heat resistance of the narrow portion 36C1 being made large, the transmission of the heat of the LED chip 10 from the rod holder 36 to the tapered rod 20 is suppressed, and there is no case in which the optical characteristic of the tapered rod 20 deteriorates.

[Third Embodiment]

Figure 8:
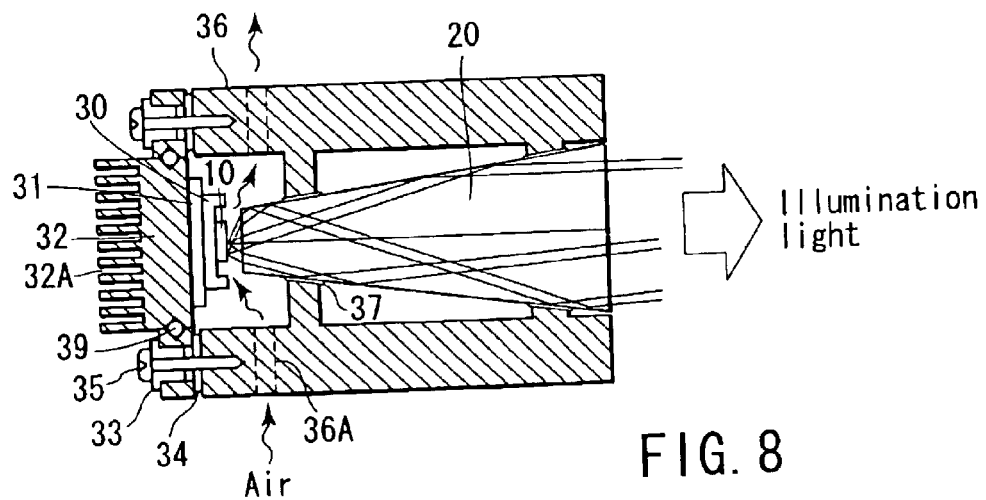
FIG. 8 is a cross sectional view showing a structure of a third embodiment of an illumination apparatus of the invention.

Next, a third embodiment of the present invention will be described. As shown in FIG. 8, an illumination apparatus relating to the third embodiment of the invention uses the LED chip 10 serving as the illuminant and uses the tapered rod 20 serving as the light guiding member. Further, as illustrated, the LED chip 10 and the tapered rod 20 are integrally held such that the LED chip 10 and the incident end 22 of the tapered rod 20 are disposed at predetermined positions which are closed to one another via a thin air layer by a holding member constituted of the LED base 30, the LED substrate 31, the LED holder 32, linear guides 39 integrally provided at the LED holder 32, the collars 33, the spacers 34, the fixing screws 35, and the rod holder 36.

In the illuminant apparatus having such a structure, the LED chip 10 and the tapered rod 20 are held so as to be relatively (in the direction perpendicular to the paper plane) movable while maintaining a predetermined interval as is by the linear guides 39 integrally provided with the LED holder 32. Accordingly, because the LED chip 10 can be shifted from the position facing the incident end 22 of the tapered rod 20 by driving means (not shown), transmission of heat to the tapered rod 20 can be suppressed, and the LED chip 10 can be effectively cooled. Further, because the LED chip 10 and the tapered rod 20 can be moved while maintaining the predetermined interval as is in this way, it is configured such that a plurality of LED chips 10 are arranged in the moving direction, and due to light-emitting control being carried out such that only the LED chip 10 which reached the position facing the incident end 22 of the tapered rod 20 is made to emit light, the LED chip 10 emitting light can be switched. Therefore, a life per one LED can be lengthened, and a color of illumination light can be changed by using the LED chip 10 whose luminescent color is different.

[Fourth Embodiment]

Next, a fourth embodiment of the present invention will be described. In the fourth embodiment, an illumination apparatus illuminates an objective irradiating plane by using the illumination apparatus relating to one of the first to third embodiments described above as an illuminant unit.

Figure 9:
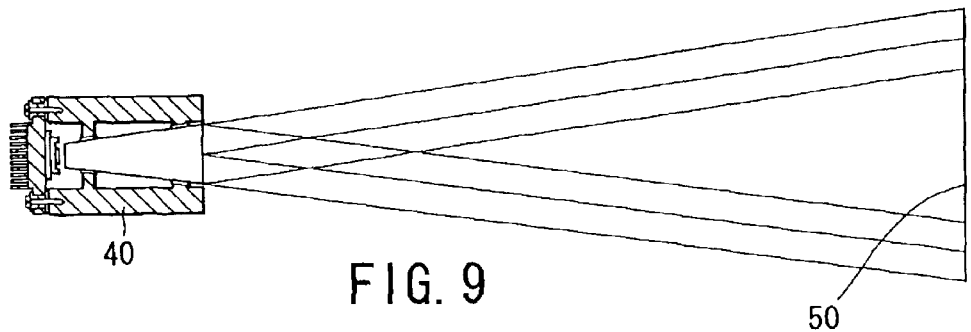
FIG. 9 is a cross sectional view showing a structure of a fourth embodiment of an illumination apparatus of the invention.

FIG. 9 is a cross sectional view showing a structure of the fourth embodiment of the illumination apparatus of the invention. Namely, illumination is carried out by directly irradiating the illumination light from an illumination unit 40 which is the illumination apparatus relating to one of the first to third embodiments, for example, to the first embodiment of the invention as shown in FIG. 1 onto the objective irradiating plane 50.

In accordance with the fourth embodiment, the illumination apparatus can be realized with a simple structure.

Note that a plurality of illumination units 40 irradiating illumination light may be arranged and disposed with respect to the same objective irradiating plane 50, and in this case, illumination which is brighter and has even less illumination non-uniformity is possible.

[Fifth Embodiment]

Figure 10:
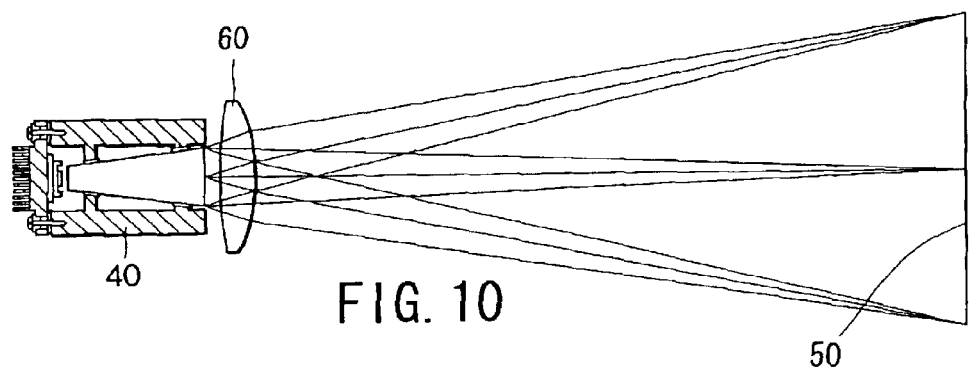
FIG. 10 is a cross sectional view showing a structure of a fifth embodiment of an illumination apparatus of the invention.

Next, a fifth embodiment of the present invention will be described. As shown in FIG. 10, in the fifth embodiment of an illumination apparatus of the invention, the illumination apparatus is an illumination apparatus which irradiates the illumination light from the illumination unit 40 which is the illumination apparatus relating to one of the first to third embodiments described above, for example, to the first embodiment of the invention shown in FIG. 1 onto the objective irradiating plane 50 in the vicinity of the rear side focal point position of the illumination lens 60 via an illumination lens 60 disposed in the vicinity of the illumination unit 40.

In accordance with the fifth embodiment, the illumination apparatus having little illumination non-uniformity is possible. Further, because the illumination lens 60 is disposed in the vicinity of the illumination unit 40, the illumination apparatus formed from these illumination unit 40 and illumination lens 60 can be compactly configured.

Note that a plurality of illumination units 40 may be arranged and disposed with respect to the one illumination lens 60, and in this case, illumination which is brighter and has even less illumination non-uniformity is possible.

[Sixth Embodiment]

Figure 11:
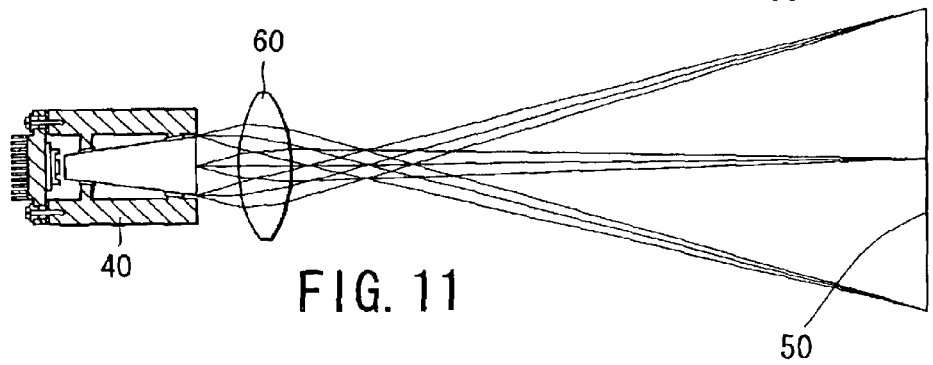
FIG. 11 is a cross sectional view showing a structure of a sixth embodiment of an illumination apparatus of the invention.

Next, a sixth embodiment of the present invention will be described. As shown in FIG. 11, in the sixth embodiment of an illumination apparatus of the invention, illumination is carried out by irradiating the illumination light from the illumination unit 40 onto the objective irradiating plane 50 by using the illumination lens 60 imaging the outgoing end of the illumination unit 40 which is the illumination apparatus relating to one of the first to third embodiments described above, for example, to the first embodiment of the invention as shown in FIG. 1 on the objective irradiating plane 50.

In accordance with the sixth embodiment, illumination can be carried out in a shape corresponding to the shape of the outgoing end of the illumination unit 40.

[Seventh Embodiment]

Next, a seventh embodiment of the present invention will be described. FIG. 12 is a diagram showing a structure of a first embodiment of a display apparatus using, as the illumination unit, the illumination apparatus relating to one of the first to third embodiments as the seventh embodiment of the invention. Namely, for example, the illumination lens 60 condensing light from the outgoing end is provided at the outgoing end side of the illumination unit 40 which is the illumination apparatus relating to the first embodiment of the invention as shown in FIG. 1, and a slide film 70 serving as an image display member is disposed in the vicinity of the rear side focal point position of the illumination lens 60. At this time, given that a rear side focal length of the illumination lens 60 is L, a width across dimension of the slide film 70 is 2W, and a maximum angle of the light ray radiated from the outgoing end of the illumination unit 40 is θmax (refer to FIG. 2), it is configured so as to satisfy:

$$\tan^{-1}(W/L) \leq \theta\max.$$

Moreover, a projection lens 80 formed from two lenses is disposed at the rear side of the slide film 70, and an image of the slide film 70 is imaged and projected on a screen (not shown) or the like serving as an image projection plane 90.

Due to the display apparatus being configured in this way, the light radiated from the outgoing end of the light guiding member can be condensed onto a given region at the rear side focal point position of the illumination lens 60 regardless of the outgoing position from the outgoing end. Therefore, the slide film 70 serving as the image display member can be efficiently illuminated, and a bright display image can be obtained.

Further, in general, an image height Y at the focal point position with respect to an angle of view θ of the light ray incident into the lens whose focal length is L can be expressed by Y=L×tan θ. Therefore, when the width across dimension of the image display member is 2W, given that the maximum angle of the light ray radiated from the outgoing end of the illumination unit 40 is θmax, due to the relationship of $\tan^{-1}(W/L) \leq \theta\max$ being satisfied, the light radiated from the outgoing end of the light guiding member can be effectively irradiated with respect to the size of the image display member. Note that, from the standpoint of usage efficiency of light, it suffices that θmax is made as small as possible within a range in which it satisfies the relational expression.

Note that, in the present embodiment, the slide film 70 is used as the image display member. However, it goes without saying that the image display member may be an LCD panel or a display device such as a two dimensional micro mirror deflection array known as a digital micro mirror device (DMD: the registered trademark of Texas Instruments Incorporated, USA) as disclosed in U.S. Pat. No. 6,129,437, or the like. Further, a transmission type lens is used as the illumination lens 60. However, the illumination lens 60 may be constituted of a reflective mirror having the same effect or a combination of a lens and a mirror. Moreover, it may be configured such that the projection lens 80 is not used and the image display member is directly seen, and an eyepiece for imaging an image on a retina may be used in place of the projection lens 80.

[Eighth Embodiment]

Next, an eighth embodiment of the present invention will be described. FIG. 13 is a diagram showing a structure of a second embodiment of the display apparatus using, as an illumination unit, the illumination apparatus relating to one of the first to third embodiments as the eighth embodiment of the invention. Namely, for example, the illumination lens 60 which condenses light from the outgoing end is disposed at the outgoing end side of the illumination unit 40 which is the illumination apparatus relating to the first embodiment of the invention as shown in FIG. 1 such that the outgoing end of the illumination unit 40 is positioned at the front side focal point position of the illumination lens 60. Furthermore, an LCD 71 serving as the image display member is disposed in the vicinity of the rear side focal point position of the illumination lens 60. At this time, given that a rear side focal length of the illumination lens 60 is L, a width across dimension of the LCD 71 is 2W, and a maximum angle of the light ray radiated from the outgoing end of the illumination unit 40 is θmax (refer to FIG. 2), it is configured so as to satisfy:

$$\tan^{-1}(W/L) \leq \theta\max.$$

Moreover, the projection lens 80 formed from two lenses is disposed at the rear side of the LCD 71, and an image of the LCD 71 is imaged and projected on a screen (not shown) or the like which is the image projection plane 90.

Due to the display apparatus being configured in this way, in the same way as in the seventh embodiment, because the light radiated from the outgoing end of the light guiding member can be condensed onto a given region at the rear side focal point position of the illumination lens 60 regardless of the outgoing position from the outgoing end, the LCD 71 serving as the image display member can be efficiently illuminated, and a bright display image can be obtained. Further, in particular, in the present embodiment, the light radiated from the outgoing end of the light guiding member can be condensed onto a given region at the rear side focal point position of the illumination lens 60 regardless of the outgoing position, and at the same time, a distribution of the angle of incidence of the light which was condensed within the illuminated range can be made small. Therefore, in particular, the LCD 71 serving as the image display member in which a dependency on angle of incidence is large can be efficiently illuminated, and a bright display image without unevenness can be obtained.

Further, in general, an image height Y at the focal point position with respect to the angle of view θ of the light ray incident into the lens whose focal length is L can be expressed by Y=L×tan θ. Therefore, when the width across dimension of the image display member is 2W, given that the maximum angle of the light ray radiated from the outgoing end of the illumination unit 40 is θmax, due to the relationship of $\tan^{-1}(W/L) \leq \theta\max$ being satisfied, the light radiated from the outgoing end of the light guiding member can be effectively irradiated with respect to the size of the image display member. Note that, from the standpoint of usage efficiency of light, it suffices that θmax is made as small as possible within a range in which it satisfies the relational expression.

Note that, in the present embodiment, the LCD 71 is used as the image display member. However, the image display member may be a slide film, a two-dimensional micro mirror deflection array, or the like. Further, a transmission type lens is used as the illumination lens 60. However, the illumination lens 60 may be constituted of a reflective mirror having the same effect or a combination of a lens and a mirror. Moreover, it may be configured such that the projection lens 80 is not used and the image display member is directly seen, and an eyepiece for imaging an image on a retina may be used in place of the projection lens 80.

[Ninth Embodiment]

Figure 14:
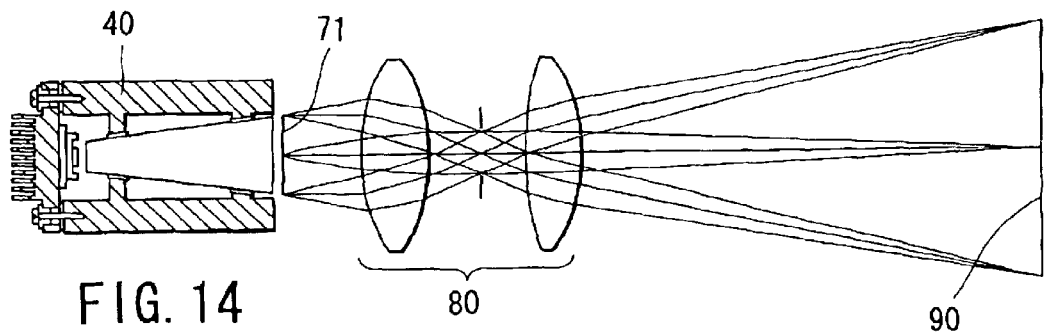
FIG. 14 is a diagram showing a structure of a third embodiment of an display apparatus using, as the illumination unit, the illumination apparatus relating to one of the first to third embodiments as a ninth embodiment of the invention.

Next, a ninth embodiment of the present invention will be described. FIG. 14 is a diagram showing a structure of a third embodiment of the display apparatus using, as an illumination unit, the illumination apparatus relating to one of the first to third embodiments as the ninth embodiment of the invention. Namely, for example, the LCD 71 serving as the image display member is disposed in the vicinity of the outgoing end of the illumination unit 40 which is the illumination apparatus relating to the first embodiment of the invention as shown in FIG. 1, and the a projection lens 80 formed from two lenses serving as a projection optical system is disposed at the rear side of the LCD 71. At this time, an image of the LCD 71 is imaged and projected on a screen (not shown) or the like which is the image projection plane 90 by the projection lens 80.

In accordance with the present embodiment, a display apparatus which projects an image with a simple structure and in which an optical efficiency is high can be realized.

Note that the LCD 71 is used as the image display member. However, the image display member may be a display device such as a slide film, a two-dimensional micro mirror deflection array, or the like. Moreover, the transmission type lenses are used as the projection lens 80. However, the projection lens 80 may be constituted of reflective mirrors having the same effect or a combination of a lens and a mirror.

The invention was described above on the basis of the embodiments. However, the invention is not limited to the embodiments described above, and it goes without saying that various modifications and applications are possible within a range which does not deviate from the gist of the invention. For example, the cross sectional shapes of the tapered rod 20 and the tapered pipe 23 may be rectangular, and may be circular or elliptical as well. Further, the material of the tapered rod 20 may be a glass, and may be a transparent resin.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An illumination apparatus comprising:
    an illuminant which radiates diffused light from an outgoing plane and generates heat;
    a light guiding member configured to guide the diffused light from the illuminant while reflecting the diffused light at an internal surface thereof, the light guiding member including: an incident end which is close to the outgoing plane of the illuminant, and into which the diffused light is incident and which is larger than the outgoing plane of the illuminant; and an outgoing end which is larger than the incident end; and a holding member configured to integrally hold the illuminant and the light guiding member at a predetermined interval, the holding member including: a heat conducting portion configured to conduct the heat generated at the illuminant; and a heat radiating portion configured to radiate heat from the heat conducting portion; and wherein the holding member includes a heat insulating portion configured to suppress conduction of heat between the heat radiating portion and the light guiding member.

2. The apparatus according to claim 1, wherein the holding member holds the illuminant and the light guiding member so as to be relatively movable while maintaining the illuminant and the light guiding member at a predetermined interval.

3. The apparatus according to claim 1, wherein the heat insulating portion has a cross sectional area smaller than that of the heat conducting portion.

4. The apparatus according to claim 1, wherein the heat insulating portion is formed from a material whose heat conductivity is lower than the heat conductivity of the heat conducting portion.

5. The apparatus according to claim 1, wherein a translucent heat insulating member having a low heat conductivity is interposed between the illuminant and the light guiding member.

6. The apparatus according to claim 1, wherein the holding member provides an air flow path between the illuminant and the light guiding member.

7. The apparatus according to claim 1, wherein the light guiding member includes a light guiding element configured to transmit the light incident from the incident end, to the outgoing end by total reflection.

8. The apparatus according to claim 1, wherein the light guiding member has a hollow structure in which the side surface is formed from a reflective mirror, and transmits the light incident from the incident end, to the outgoing end by reflection.

9. A display apparatus comprising:
an illumination apparatus including:
an illuminant which radiates diffused light from an outgoing plane and generates heat;
a light guiding member configured to guide the diffused light from the illuminant while reflecting the diffused light at an internal surface thereof, the light guiding member having: an incident end which is close to the outgoing plane of the illuminant, and into which the diffused light is incident and which is larger than the outgoing plane of the illuminant; and an outgoing end which is larger than the incident end; and
a holding member configured to integrally hold the illuminant and the light guiding member at a predetermined interval, the holding member having: a heat conducting portion configured to conduct the heat generated at the illuminant; and a heat radiating portion configured to radiate heat from the heat conducting portion;
an illumination lens configured to condense the light from the outgoing end of the light guiding member of the illumination apparatus; and
an image display member disposed in a vicinity of a rear side focal point position of the illumination lens, wherein the holding member includes a heat insulating portion configured to suppress conduction of heat between the heat radiating portion and the light guiding member.

10. The apparatus according to claim 9, wherein the illumination lens is disposed further such that the outgoing end of the light guiding member is positioned at the a front side focal point position.

11. The apparatus according to claim 9, wherein, given that a width across dimension of the image display member is 2W and a focal length of the illumination lens is L, the light guiding member makes a maximum angle of a light ray radiated from the outgoing end to be $\tan^{-1}(W/L)$ or more.

12. The apparatus according to claim 9, wherein the holding member holds the illuminant and the light guiding member so as to be relatively movable while maintaining the illuminant and the light guiding member at a predetermined interval.

13. The apparatus according to claim 9, wherein the heat insulating portion has a cross sectional area smaller than that of the heat conducting portion.

14. The apparatus according to claim 9, wherein the heat insulating portion is formed from a material whose heat conductivity is lower than the a heat conductivity of the heat conducting portion.

15. The apparatus according to claim 9, wherein a translucent heat insulating member having a low heat conductivity is interposed between the illuminant and the light guiding member.

16. The apparatus according to claim 9, wherein the holding member provides an air flow path between the illuminant and the light guiding member.

17. The apparatus according to claim 9, wherein the light guiding member includes a light guiding element configured to transmit the light incident from the incident end, to the outgoing end by total reflection.

18. The apparatus according to claim 9, wherein the light guiding member has a hollow structure in which a side surface is formed from a reflective mirror, and transmits the light incident from the incident end, to the outgoing end by reflection.

19. A display apparatus comprising:
an illumination apparatus including:
an illuminant which radiates diffused light from an outgoing plane and generates heat;
a light guiding member configured to guide the diffused light from the illuminant while reflecting the diffused light at an internal surface thereof, the light guiding member having: an incident end which is close to the outgoing plane of the illuminant, and into which the diffused light is incident and which is larger than the outgoing plane of the illuminant; and an outgoing end which is larger than the incident end; and
a holding member configured to integrally hold the illuminant and the light guiding member at a predetermined interval, the holding member having: a heat conducting portion configured to conduct the heat generated at the illuminant; and a heat radiating portion configured to radiate heat from the heat conducting portion;
an image display member disposed in the vicinity of the outgoing end of the light guiding member of the illumination apparatus; and
a projection optical system configured to image an image of the image display member on a projection plane, wherein the holding member includes a heat insulating portion configured to suppress conduction of heat between the heat radiating portion and the light guiding member.

20. The apparatus according to claim 19, wherein the holding member holds the illuminant and the light guiding member so as to be relatively movable while maintaining the illuminant and the light guiding member at a predetermined interval.

21. The apparatus according to claim 19, wherein the heat insulating portion has a cross sectional area smaller than that of the heat conducting portion.

22. The apparatus according to claim 19, wherein the heat insulating portion is formed from a material whose heat conductivity is lower than a heat conductivity of the heat conducting portion.

23. The apparatus according to claim 19, wherein a translucent heat insulating member having a low heat conductivity is interposed between the illuminant and the light guiding member.

24. The apparatus according to claim 19, wherein the holding member provides an air flow path between the illuminant and the light guiding member.

25. The apparatus according to claim 19, wherein the light guiding member includes a light guiding element configured to transmit the light incident from the incident end, to the outgoing end by total reflection.

26. The apparatus according to claim 19, wherein the light guiding member has a hollow structure in which a side surface is formed from a reflective mirror, and transmits the light incident from the incident end to the outgoing end by reflection.

27. An illumination apparatus comprising:
  illuminant means for radiating diffused light from an outgoing plane and generates heat;
  light guiding means for guiding the diffused light from said illuminant means while reflecting the diffused light at an internal surface thereof, the light guiding means including: an incident end which is close to the outgoing plane of said illuminant means, and into which the diffused light is incident and which is larger than the outgoing plane of said illuminant means; and an outgoing end which is larger than the incident end; and
  holding means for integrally holding said illuminant means and light guiding means at a predetermined interval, said holding means including: a heat conducting portion which conducts the heat generated at said illuminant means, a heat radiating portion which radiates heat from the heat conducting portion, and a heat insulating portion for suppressing conduction of heat between said heat radiating portion and said light guiding means.

28. A display apparatus comprising:
  an illumination apparatus including:
    illuminant means for radiating diffused light from an outgoing plane and generates heat;
    light guiding means for guiding the diffused light from said illuminant means while reflecting the diffused light at an internal surface thereof, said light guiding means having: an incident end which is close to the outgoing plane of said illuminant means, and into which the diffused light is incident and which is larger than the outgoing plane of said illuminant means; and an outgoing end which is larger than the incident end; and
    holding means for integrally holding said illuminant means and light guiding means at a predetermined interval, said holding means having: a heat conducting portion which conducts the heat generated at said illuminant means; and a heat radiating portion which radiates heat from the heat conducting portion;
  illumination lens means for condensing the light from the outgoing end of said light guiding means of the illumination apparatus;
  image displaying means disposed in a vicinity of a rear side focal point position of the illumination lens means; and
  said holding means further comprising a heat insulating portion for suppressing conduction of heat between said heat radiating portion and said light guiding means.

29. A display apparatus comprising:
  an illumination apparatus including:
    illuminant means for radiating diffused light from an outgoing plane and generates heat;
    light guiding means for guiding the diffused light from said illuminant means while reflecting the diffused light at an internal surface thereof, said light guiding means having: an incident end which is close to the outgoing plane of said illuminant means, and into which the diffused light is incident and which is larger than the outgoing plane of said illuminant means; and an outgoing end which is larger than the incident end; and
  holding means for integrally holding said illuminant means and light guiding means at a predetermined interval, said holding means having: a heat conducting portion which conducts the heat generated at said illuminant means; and a heat radiating portion which radiates heat from the heat conducting portion;
  image displaying means disposed in a vicinity of the outgoing end of said light guiding means of the illumination apparatus;
  projection optical means for imaging an image of the image displaying means on a projection plane; and
  said holding means further comprising, a heat insulating portion for suppressing conduction of heat between said heat radiating portion and said light guiding means.

* * * * *

UNITED STATES PATENT AND TRADEMARK OFFICE
CERTIFICATE OF CORRECTION

PATENT NO. : 6,905,214 B2
DATED : June 14, 2005
INVENTOR(S) : Naoaki Tani

It is certified that error appears in the above-identified patent and that said Letters Patent is hereby corrected as shown below:

<u>Column 14,</u>
Line 7, after "at", delete "the".
Line 23, after "than", delete "the".

<u>Column 15,</u>
Lines 31 and 52, after "plane", delete "and" and insert -- which --.

<u>Column 16,</u>
Line 28, after "plane", delete "and" and insert -- which. --.

Signed and Sealed this

Twenty-first Day of March, 2006

JON W. DUDAS
*Director of the United States Patent and Trademark Office*